US012745699B2

(12) United States Patent
Ji et al.

(10) Patent No.: US 12,745,699 B2
(45) Date of Patent: Sep. 29, 2026

(54) STAND-ON MOWER

(71) Applicant: Greenworks (Jiangsu) Co., Ltd., Changzhou (CN)

(72) Inventors: Qin Ji, Changzhou (CN); Qinghua Shi, Changzhou (CN); Qunli Wei, Changzhou (CN); Wenwei Wang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 623 days.

(21) Appl. No.: 18/337,415

(22) Filed: Jun. 19, 2023

(65) Prior Publication Data

US 2023/0337578 A1 Oct. 26, 2023

Related U.S. Application Data

(63) Continuation of application No. PCT/CN2021/141483, filed on Dec. 27, 2021.

(30) Foreign Application Priority Data

Dec. 28, 2020 (CN) ......................... 202011583672.1
Dec. 28, 2020 (CN) ......................... 202023220856.X
Jan. 13, 2021 (CN) ......................... 202120085278.9

(51) Int. Cl.
*A01D 34/66* (2006.01)
*A01D 34/86* (2006.01)
*A01D 101/00* (2006.01)

(52) U.S. Cl.
CPC .............. *A01D 34/86* (2013.01); *A01D 34/66* (2013.01); *A01D 2101/00* (2013.01)

(58) Field of Classification Search
CPC ...... A01D 34/00; A01D 34/001; A01D 34/74; A01D 34/66; A01D 34/86; A01D 34/82; A01D 34/828; A01D 2101/00; A01D 75/28
See application file for complete search history.

(56) References Cited

U.S. PATENT DOCUMENTS 9,699,965 B2 * 7/2017 Schygge ................ B60L 50/66
2003/0201106 A1 10/2003 Jessen
2007/0271895 A1 * 11/2007 Nogami ................ A01D 34/74 56/17.1
2008/0229725 A1 * 9/2008 Shaffer ................ A01D 34/74 56/17.1
2009/0302562 A1 * 12/2009 Kallevig ................ A01D 34/64 280/32.7

(Continued)

FOREIGN PATENT DOCUMENTS

EP 3097758 A1 * 11/2016 ............ A01D 75/18
WO 2017173945 A1 10/2017

(Continued)

*Primary Examiner* — Adam J Behrens

(57) ABSTRACT

A mower including a body, a working unit, a wheel unit, a platform and a pedal. The working unit is coupled to the body. The wheel unit is mounted on the body and includes a front wheel unit and a rear wheel unit. The platform is mounted on the body and is located on a side of the rear wheel unit away from the front wheel unit. The pedal is in an axial direction of the rear wheel unit and located on a side of the body. Wherein, a height of the pedal to ground is greater than a height of the platform to the ground.

18 Claims, 16 Drawing Sheets

(56) References Cited

U.S. PATENT DOCUMENTS

| | | | | |
|---|---|---|---|---|
| 2011/0316315 | A1 | 12/2011 | Marshall | |
| 2017/0156262 | A1* | 6/2017 | Reichard | A01D 34/64 |
| 2019/0166758 | A1 | 6/2019 | Phillip et al. | |
| 2020/0352098 | A1 | 11/2020 | Fujii et al. | |
| 2021/0127577 | A1* | 5/2021 | Weihl | A01D 34/66 |
| 2023/0180657 | A1* | 6/2023 | Zeiler | A01D 69/02 56/13.6 |

FOREIGN PATENT DOCUMENTS

| | | | |
|---|---|---|---|
| WO | 2017214467 | A1 | 12/2017 |
| WO | 2019035021 | A1 | 2/2019 |

* cited by examiner

STAND-ON MOWER

TECHNICAL FIELD

The disclosure relates to the technical field of garden tools, and particularly relates to a mower.

BACKGROUND

Mowers are common mowing equipment with high efficiency and easy operation, which is suitable for mowing lawns such as sanitation grasslands and green areas.

A platform is arranged at a tail of the mower for operators to stand on. When the mower is running on a slope, heights of left and right wheels of the mower are different, so that the mower and the platform are inclined, and the operator standing on the platform also inclines. In this way, when the mower encounters potholes on the ground when running, it is easy to cause the mower to be overturned, thereby bringing safety hazards to the operator.

Generally, the mower is provided with a working unit for mowing, but since grass is not completely level and there are height differences, the control of the working unit on a height of the mowing is affected.

In view of the above problems, it is necessary to provide a new mower to solve the above problems.

SUMMARY

The disclosure provides a mower to solve the problems mentioned above.

The disclosure provides a mower. The mower includes a body, a working unit, a wheel unit, a platform and a pedal. The working unit is coupled to the body. The wheel unit is mounted on the body and includes a front wheel unit and a rear wheel unit. The platform is mounted on the body and is located on a side of the rear wheel unit away from the front wheel unit. In an axial direction of the rear wheel unit, the pedal is located on a side of the body. Wherein, a height of the pedal to ground is greater than a height of the platform to the ground. Since the mower of the disclosure is provided with the platform and the pedal with different heights, when the mower is on a slope, users may stand steadily, stand upright, and may easily adjust their own center of gravity, so that the stand on mower is not easy to be overturned.

As an improvement of the disclosure, the pedal includes a first pedal and a second pedal, in a forward direction of the mower, the second pedal is located on a side of the first pedal away from the front wheel unit.

As an improvement of the disclosure, a height of the first pedal to the ground is greater than a height of the second pedal to the ground.

As an improvement of the disclosure, in the forward direction of the mower, a length of the first pedal is greater than a length of the second pedal.

As an improvement of the disclosure, in the axial direction of the rear wheel unit, a width of the first pedal is smaller than a width of the second pedal.

As an improvement of the disclosure, a projection of the first pedal on a horizontal plane at least partially overlaps a projection of the rear wheel unit on the horizontal plane.

As an improvement of the disclosure, a projection of the second pedal on the horizontal plane does not overlap a projection of the rear wheel unit on the horizontal plane.

As an improvement of the disclosure, the wheel unit further includes a fender matched with the rear wheel unit, and the second pedal is mounted on the fender.

As an improvement of the disclosure, the wheel unit further includes a fender matched with the rear wheel unit, and the first pedal is mounted on the fender.

As an improvement of the disclosure, the pedal includes a first pedal, and an angle between the first pedal and a forward direction of the mower is from 0° to 60°.

As an improvement of the disclosure, the pedal includes a first pedal, and an angle between the first pedal and the axial direction of the rear wheel unit is from 0° to 50°.

As an improvement of the disclosure, the pedal includes a second pedal, and an angle between the second pedal and a forward direction of the mower is from 0° to 40°.

As an improvement of the disclosure, the pedal includes a second pedal, and an angle between the second pedal and the axial direction of the rear wheel unit is from 0° to 50°.

As an improvement of the disclosure, the pedal includes a first pedal, and a vertical height of the first pedal from a horizontal ground is from 30 cm to 60 cm.

As an improvement of the disclosure, the pedal further includes a first pedal, in a forward direction of the mower, a distance between the first pedal and a center of gravity of the mower is from 10 cm to 60 cm.

As an improvement of the disclosure, the pedal includes a first pedal, an area of the first pedal is from 150 $cm^2$ to 850 $cm^2$.

As an improvement of the disclosure, the pedal further includes a first pedal, in a forward direction of the mower, the mower has a centerline, and a distance between the first pedal and the centerline is from 20 cm to 60 cm.

As an improvement of the disclosure, the pedal includes a second pedal, and a vertical height of the second pedal from the horizontal ground is from 20 cm to 50 cm.

As an improvement of the disclosure, the pedal includes a second pedal, and an area of the second pedal is from 100 $cm^2$ to 800 $cm^2$.

As an improvement of the disclosure, the pedal further includes a second pedal, in a forward direction of the mower, the mower has a centerline, and a distance between the second pedal and the centerline is from 30 cm to 70 cm.

As an improvement of the disclosure, the mower further includes a height adjustment mechanism. The height adjustment mechanism includes:

a side plate, the side plate being arranged on a side of the body and provided with a fixed shaft, a handle assembly, the handle assembly including a handle, a lower end of the handle being movably arranged on the body, the handle being provided with a hook and a control rod, and the control rod being used to control the hook to bounce up to enable the hook to be matched with the fixed shaft to fix the handle, and a pair of first height adjustment plates, the pair of first height adjustment plates being respectively arranged on both sides of the body and being connected to the working unit, the handle being connected with one of the pair of first height adjustment plates to adjust a height of the working unit through rotating the handle.

As an improvement of the disclosure, the hook is rotatably arranged on the handle, the control rod is movably connected with one end of the hook, and the other end of the hook is provided with a hook connecting part to clamp.

As an improvement of the disclosure, each of the first height adjustment plates includes a vertical plate and a horizontal plate that are connected with each other, the horizontal plates are connected to the working mechanism, the handle is connected with one of the vertical plates, so that when the handle is rotated, the horizontal plates are capable of being lifted up to realize a height adjustment of the working unit.

As an improvement of the disclosure, the height adjustment mechanism further includes a transmission assembly, the transmission assembly includes a first transmission shaft, and the pair of first height adjustment plates are respectively arranged at both ends of the first transmission shaft, and the handle drives one of the first height adjustment plate connected with the handle to rotate and drives the other first height adjustment plate to rotate through the first transmission shaft so as to realize the height adjustment of the working unit.

As an improvement of the disclosure, the height adjustment mechanism further includes a pair of second height adjustment plates, a second transmission shaft and a linkage rod, the second height adjustment plates have same structures as the first height adjustment plates, the pair of second height adjustment plates is arranged at both ends of the second transmission shaft, and the linkage rod is arranged on a side opposite to the handle and connects the vertical plates of the first height adjustment plate and the second height adjustment plate on a same side to realize a synchronous rotation of the first transmission shaft and the second transmission shaft.

As an improvement of the disclosure, the height adjustment mechanism further includes an elastic fixing component, one end of the elastic fixing component is fixed on the side plate, and the other end thereof is connected to the vertical plate of the second height adjustment plate on a same side as the handle assembly.

As an improvement of the disclosure, the height adjustment mechanism includes two side plates arranged in parallel in a front-rear direction, the fixed shaft is horizontally arranged between the two side plates, and the handle rotates between the two side plates along the front-rear direction.

As an improvement of the disclosure, the two side plates are connected by a plurality of limiting bolts and are provided with a gap for the handle to rotate, the limiting bolts are arranged horizontally and parallel to the fixed shaft, and the limiting bolts are used to limit a front-rear direction of the handle.

As an improvement of the disclosure, the two side plates are correspondingly provided with a plurality of limiting holes therethrough, the side plate further includes a limiting rod engaged with the limiting hole, and the limiting rod is capable of being positioned in different limiting holes to limit and fix the handle at different angles.

As an improvement of the disclosure, the control rod is further sheathed with an elastic reset component to reset the control rod after the control rod is operated.

The disclosure provides a mower. The mower comprises a body,

- a working unit, the working unit being coupled to the body,
- a wheel unit, the wheel unit being mounted on the body and including a front wheel unit and a rear wheel unit,
- a platform, the platform being mounted to the body and located on a side of the rear wheel unit away from the front wheel unit, and
- a pedal, in an axial direction of the rear wheel unit, the pedal being located on a side of the body.

The disclosure provides a mower. The mower includes a body,

- a working unit, the working unit being coupled to the body,

- a wheel unit, the wheel unit being mounted on the body and including a front wheel unit and a rear wheel unit,
- a platform, the platform being mounted to the body and located on a side of the rear wheel unit away from the front wheel unit, and
- a pedal, in an axial direction of the rear wheel unit, the pedal being located on a side of the body. The pedal includes a first pedal and a second pedal, and a height of the first pedal to ground is greater than a height of the second pedals to the ground.

Since the mower of the disclosure is provided with the platform and the pedal with different heights, when the mower is on a slope, users may stand steadily, stand upright, and may easily adjust their own center of gravity, so that the mower is not easy to be overturned.

The disclosure provides a height adjustment mechanism with a self-locking structure, which can adjust a height of mowing and may be operated with one hand, and the structure is safe and reliable

PART NUMBER DESCRIPTION

Figure 1:
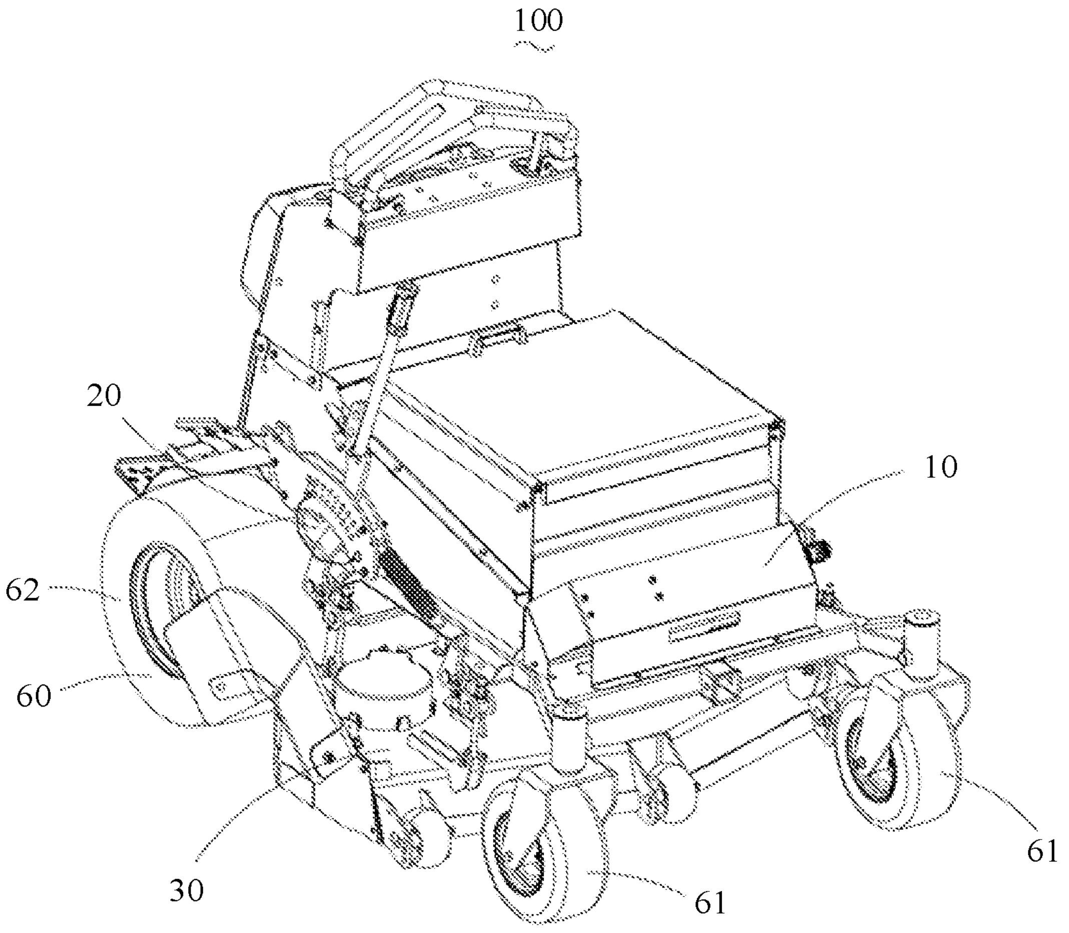
FIG. 1 is a perspective schematic view of a mower in a first embodiment of the disclosure.

Mower-100, body-10, height adjustment mechanism-20, handle mechanism-21, handle-211, hook-212, fixed shaft-213, control rod-214, elastic reset component-215, pressing shaft-216, first height adjustment plate-22, vertical plate-221, horizontal plate-222, transmission assembly-23, first transmission shaft-231, second transmission shaft-232, linkage rod-233, second height adjustment plate-24, limiting assembly-25, side plate-251, limiting bolt-252, limiting hole-253, limiting rod-254, elastic fixing component-255, working unit-30, cutting assembly-31, fixed rod-32, platform-41, shock-absorbing component-411, pedal-42, first pedal-421, mounting part-4211, stiffener-4212, second pedal-422, anti-slip patterns-43, fender-50, clamping groove-51, wheel unit-60, front wheel-61, rear wheel-62, control unit-70.

DETAILED DESCRIPTION

In order to enable the objectives, technical solutions and advantages of the disclosure to be clearer, the disclosure will be described in detail below with reference to drawings and specific embodiments.

Here, it should be noted that in order to avoid obscuring the embodiment due to unnecessary details, only the structure and/or processing steps closely related to the solution of the embodiment are shown in the drawings, and the other details that are not relevant to the embodiments are omitted.

In addition, it should also be noted that the terms "including", "comprising" or any other variation thereof are intended to include non-exclusive inclusion, so that a process, method, article or device including a series of elements not only includes those elements, but also includes other elements that are not explicitly listed, or includes elements inherent to such a process, method, article, or device.

First Embodiment

Figure 2:
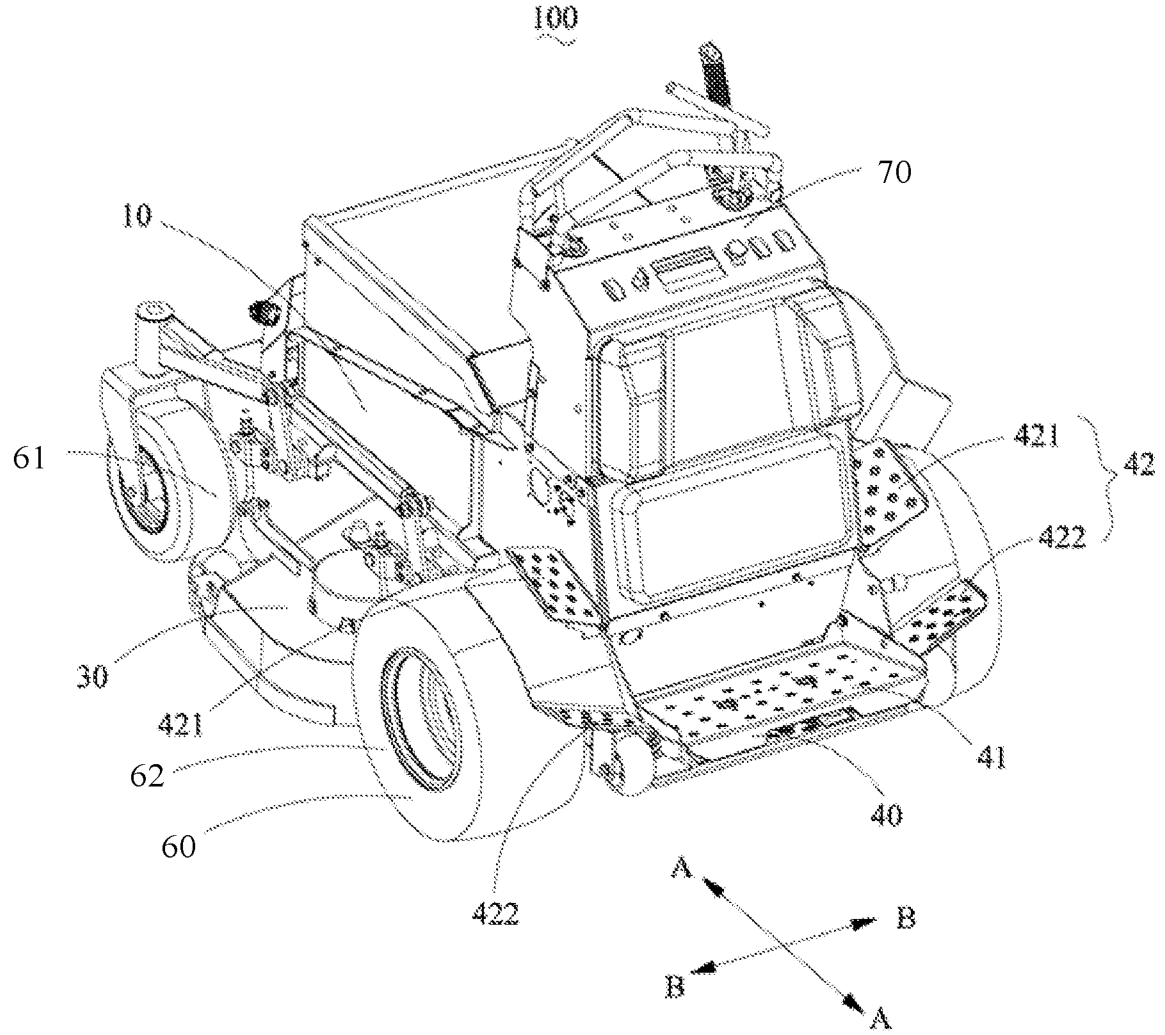
FIG. 2 is a perspective schematic view of the mower shown in FIG. 1 from another angle.
Figure 3:
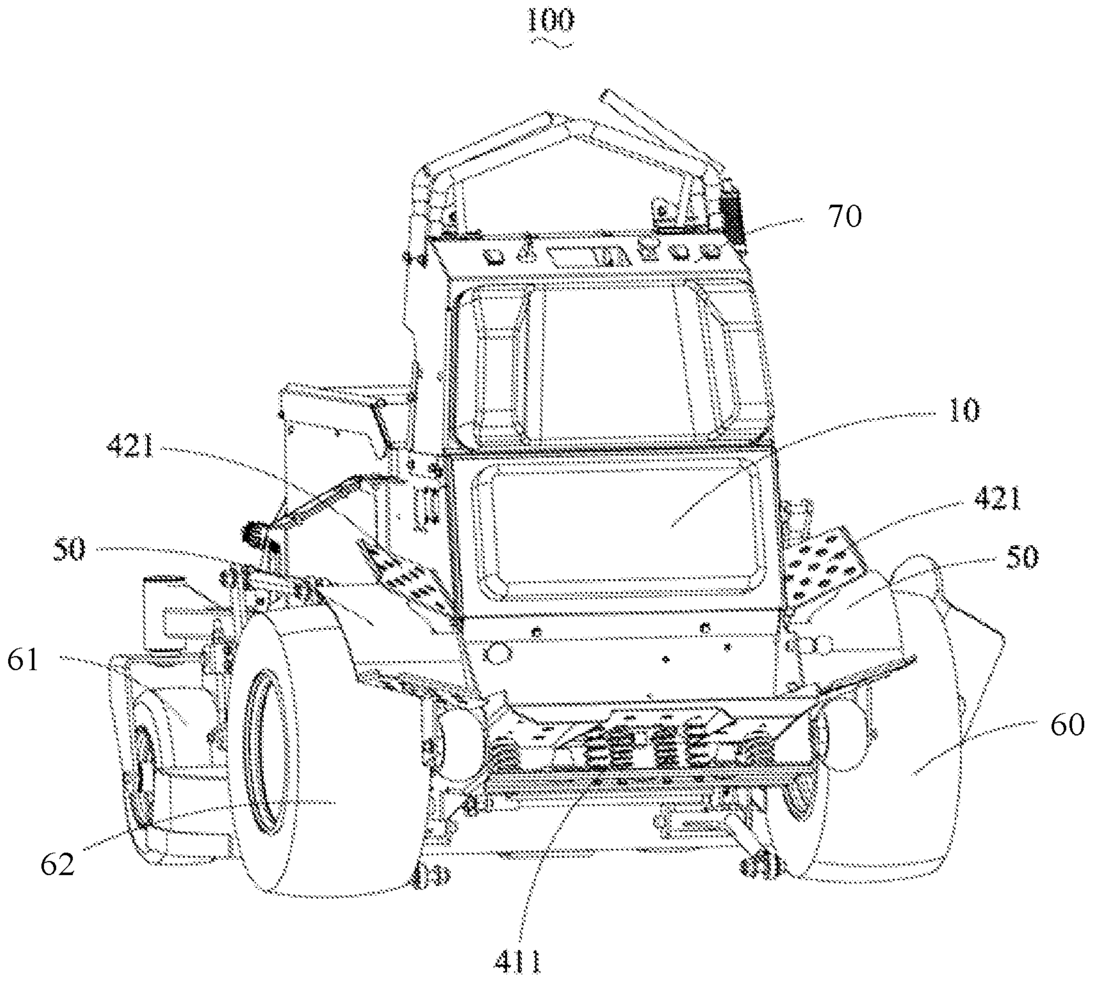
FIG. 3 is a perspective schematic view of the mower shown in FIG. 1 from yet another angle.

Please refer to FIG. 1, FIG. 2 and FIG. 3. This embodiment discloses a stand on mower 100 for users to stand on the mower for lawn mowing, thereby improving work efficiency and reducing users' workload. The mower 100 includes a body 10, a wheel unit 60 mounted on the body 10, a working unit 30, a driving mechanism (not shown), and a pedal mechanism 40.

Please refer to FIG. 1, FIG. 2 and FIG. 3, the body 10 is provided with an accommodating cavity (not shown), a control unit 70 and a height adjustment mechanism 20. The accommodating cavity is used for housing a battery pack (not shown) for powering the mower 100. The control unit 70 is used to control the wheel unit 60 and the working unit 30 to work. The height adjustment mechanism 20 is used to adjust a mowing height of the working unit 30, and the height adjustment mechanism 20 may adopt the same or different structure as in a second embodiment. The wheel unit 60 is mounted on the body 10 to drive the mower 100 to move forward, backward, and so on. The wheel unit 60 includes a front wheel unit and a rear wheel unit. The front wheel unit includes a pair of front wheels 61 and the rear wheel unit includes a pair of rear wheels 62 arranged opposite to the pair of front wheels 61. In a specific example of this embodiment, the front wheels 61 are configured as universal wheels, and the driving mechanism drives the rear wheels 62 to rotate. Of course, it can be understood that in other embodiments, the rear wheels 62 may also be universal wheels. At this time, the driving mechanism drives the rear wheels 62 to rotate. The working unit 30 is mounted at a bottom of the body 10 and located between the front wheels 61 and the rear wheels 62. The driving mechanism is used to drive the wheel unit 60 and the working unit 30 to work. In a specific example of this embodiment, the driving mechanism is a motor. However, in other embodiments, the driving mechanism may also be configured as an engine.

Figure 5:
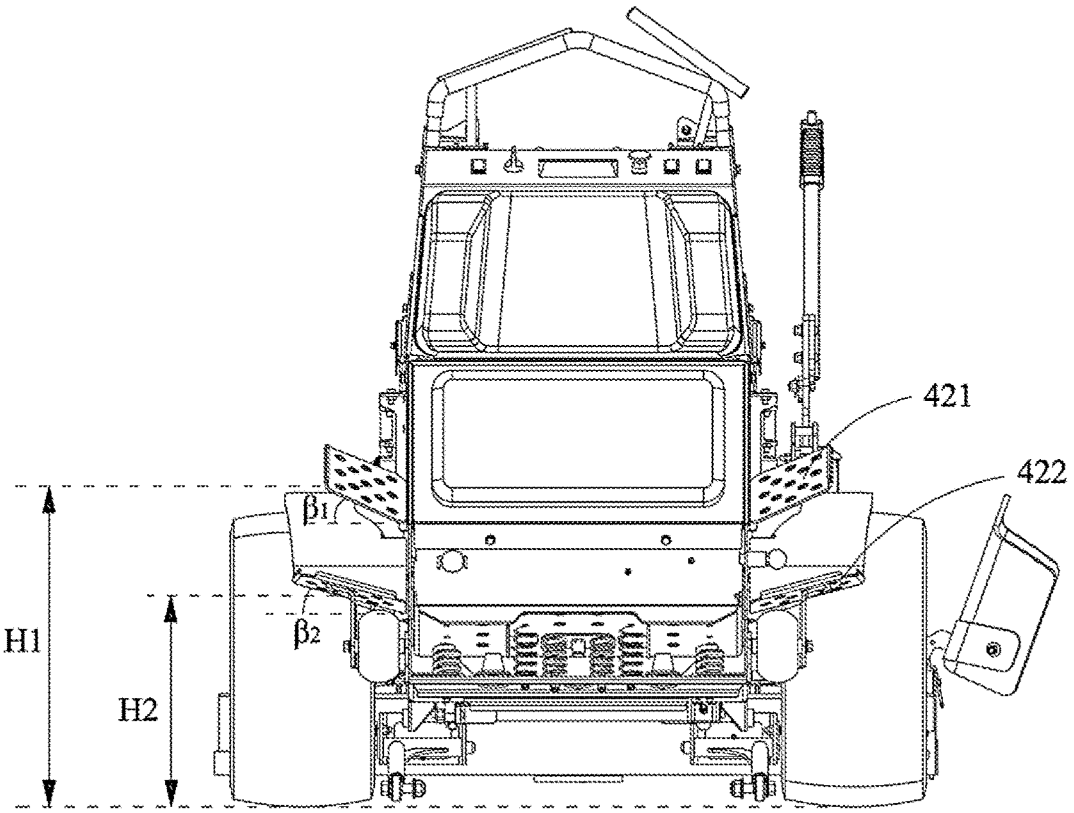
FIG. 5 is a rear side view of the mower shown in FIG. 1.

Please refer to FIG. 1, FIG. 2 and FIG. 3, the pedal mechanism 40 includes a platform 41 and a pedal 42. The platform 41 is mounted to the body 10 and is located on a side of the rear wheels 62 away from the front wheels 61. In an axial direction BB of the rear wheels 62, the platform 41 is located between the pair of rear wheels 62. With this arrangement, the space between the pair of rear wheels 62 may be fully utilized. At the same time, the disadvantage of setting the platform 41 to be too long which causes the mower 100 being too wide may also be avoided. Preferably, please refer to FIG. 3, the platform 41 is further provided with a shock-absorbing component 411. The platform 41 is mounted to the body 10 through the shock-absorbing component 411. With this arrangement, it may effectively avoid discomfort to users caused by a vibration generated when moving on uneven roads, thereby improving the users' experience. In a specific example of this embodiment, the shock-absorbing component 411 is a shock-absorbing spring. In the axial direction BB of the rear wheels 62, the pedal 42 is located on a side of the body 10, and a height of the pedal 42 to a ground is greater than a height of the platform 41 to the ground. With this arrangement, it may not only increase the user's stepping width in the axial direction BB, but also since the height of the pedal 42 to the ground is greater than the height of the platform 41 to the ground, it will not affect normal operation of the rear wheels 62. The pedal 42 includes a first pedal 421 and a second pedal 422. In a forward direction AA of the mower 100, the second pedal 422 is located on a side of the first pedal 421 away from the front wheels 61. A height of the first pedal 421 to the ground is greater than a height of the second pedal 422 to the ground. With this arrangement, it is convenient for the users to select one of the first pedal 421 and the second pedal 422 to be matched with the platform 41 according to different slope angles. For example, please refer to FIG. 11, when the slope angle of a slope is too large, one foot of the user steps on the platform 41 and the other foot steps on the first pedal 421. In this way, a height of the user's feet to the ground may be basically the same, so that the user has a better sense of balance, which may better adjust a position of a center of gravity and avoid the mower 100 from being overturned due to poor adjustment of the center of gravity. When the angle of the slope is too small, one foot of the user steps on the second pedal 422 and the other foot steps on the platform 41. Please refer to FIG. 5, a vertical height H1 of the first pedal 421 from a horizontal ground is from 30 cm to 60 cm. In some embodiments, the vertical height H1 is from 40 cm to 55 cm. In other embodiments, the vertical height H1 is from 45 cm to 55 cm. In a specific example of this embodiment, the vertical height H1 is 48 cm. A vertical height H2 of the second pedal 422 from the horizontal ground is from 20 cm to 50 cm. In some embodiments, the vertical height H2 is from 25 cm to 45 cm. In other embodiments, the vertical height H2 is from 30 cm to 40 cm. In a specific example of this embodiment, the vertical height H2 is 33 cm. In this embodiment, the vertical height H1 of the first pedal 421 from the horizontal ground is a vertical height from a center of the first pedal 421 to the horizontal ground, and the vertical height H2 of the second pedal 422 from the horizontal ground is a vertical height of a center of the second pedal 422 from the horizontal ground.

Figure 4:
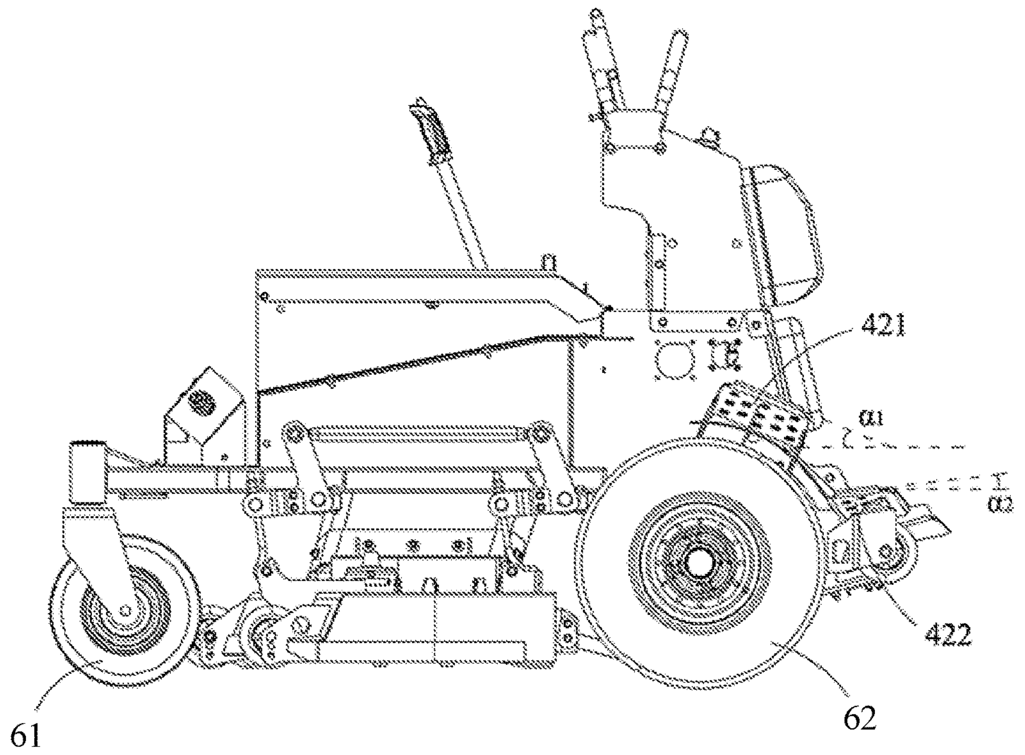
FIG. 4 is a right side view of the mower shown in FIG. 1.

Further, please refer to FIG. 4, an angle between the first pedal 421 and the forward direction AA of the mower 100 is α1, and the angle α1 is from 0° to 60°. In some embodiments, the angle α1 is from 0° to 50°. In some embodiments, the angle α1 is from 10° to 40°. In some embodiments, the angle α1 is from 20° to 30°. In a specific example of this embodiment, the angle α1 is 20°. An angle between the second pedal 422 and a direction opposite to the forward direction AA of the mower 100 is α2, and the angle α2 is from 0° to 40°. In some embodiments, the angle α2 is from 5° to 35°. In a specific example of this embodiment, the angle α2 is 10°. With this arrangement, it enables the user to have a better sense of balance when driving the mower 100 uphill or downhill. Please refer to FIG. 5, an angle between the first pedal 421 and the axial direction BB of the rear wheels 62 is β1, and the angle β1 is from 0° to 50°. In some embodiments, the angle β1 is from 10° to 40°. In some embodiments, the angle β1 is from 20° to 30°. In a specific example of this embodiment, the included angle (1 is 25°. An angle between the second pedal 422 and the axial direction BB of the rear wheels 62 is β2, and the angle β2 is from 0° to 50°. In some embodiments, the angle β2 is from 10° to 40°. In a specific example of this embodiment, the angle β2 is 15°. With this arrangement, it allows the user to have a better sense of balance when driving the mower 100 along a direction perpendicular to the uphill or the downhill.

Further, an area of the first pedal 421 is set to be from 150 $cm^2$ to 850 $cm^2$. In some embodiments, the area of the first pedal 421 is set to be from 250 $cm^2$ to 750 $cm^2$. An area of the second pedal 422 is set to be from 100 $cm^2$ to 800 $cm^2$. In some embodiments, the area of the second pedal 422 is set to be from 150 $cm^2$ to 750 $cm^2$. In some embodiments, the area of the second pedal 422 is set to be from 200 $cm^2$ to 700 $cm^2$. With this arrangement, when the user steps on the first pedal 421 and the second pedal 422, the user has a better sense of comfort and does not feel awkward. At the same time, the first pedal 421 and the second pedal 422 will not be bulky due to a large area, which affects a normal operation of the rear wheels 62. In a specific example of this embodiment, the area of the first pedal 421 is 300 $cm^2$, and the area of the second pedal 422 is 200 $cm^2$.

Further, in the forward direction AA of the mower 100, a length L1 of the first pedal 421 is greater than a length L2 of the second pedal 422. The length L1 is from 5 cm to 60 cm. In some embodiments, the length L1 is from 10 cm to 50 cm. In some embodiments, the length L1 is from 10 cm to 40 cm. In some embodiments, the length L1 is from 10 cm to 30 cm. The length L2 is from 5 cm to 60 cm. In some embodiments, the length L2 is from 10 cm to 50 cm. In some embodiments, the length L2 is from 10 cm to 40 cm. In some embodiments, the length L2 is from 10 cm to 30 cm. In a specific example of this embodiment, the length L1 is set to be 20 cm, and the length L2 is set to be 120 cm. In the axial direction BB of the rear wheels 62, a width W1 of the first pedal 421 is smaller than a width W2 of the second pedal 422. In a specific example of this embodiment, the width W1 is set to be 15 cm, and the width W2 is set to be 20 cm. In this embodiment, the lengths of the first pedal 421 and the second pedal 422 are sizes of longer sides of both. When the first pedal 421 and the second pedal 422 of this embodiment are regular quadrilaterals, such as parallelograms, the width W1 of the first pedal 421 is equal to a length of two parallel longer sides of the first pedal 421. The width W2 of the second pedal 422 is also a distance between two parallel longer sides of the second pedals 422.

Figure 6:
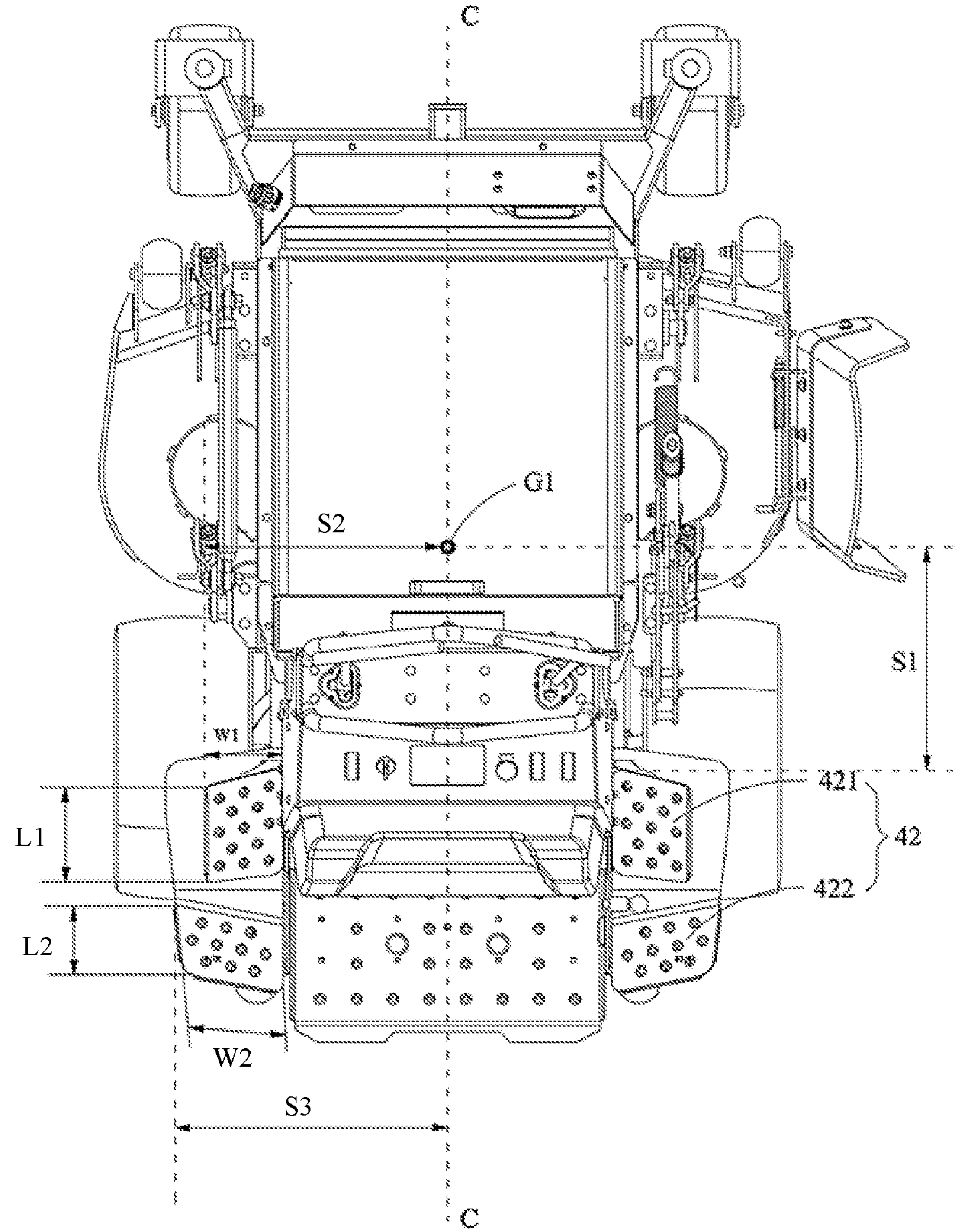
FIG. 6 is a top side view of the mower shown in FIG. 1.

Further, please refer to FIG. 6, a projection of the first pedal 421 on the horizontal plane at least partially overlaps a projection of the rear wheels 62 on the horizontal plane. With this arrangement, a space above the rear wheels 62 may be fully utilized, so that the mower 100 has a compact structure. The Projection of the second pedal 422 on the horizontal plane does not overlap the projections of the rear wheels 62 on the horizontal plane.

Figure 7:
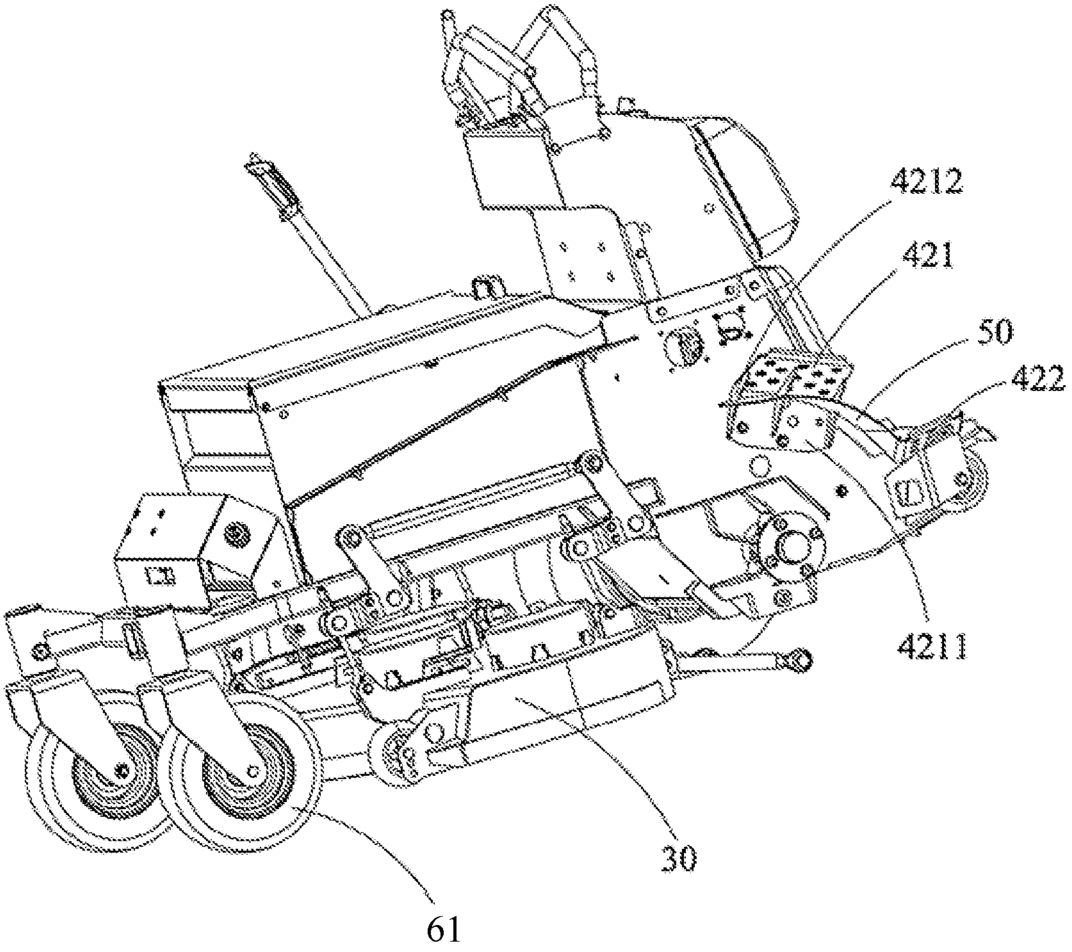
FIG. 7 is a matching schematic view of a pedal and a body.
Figure 8:
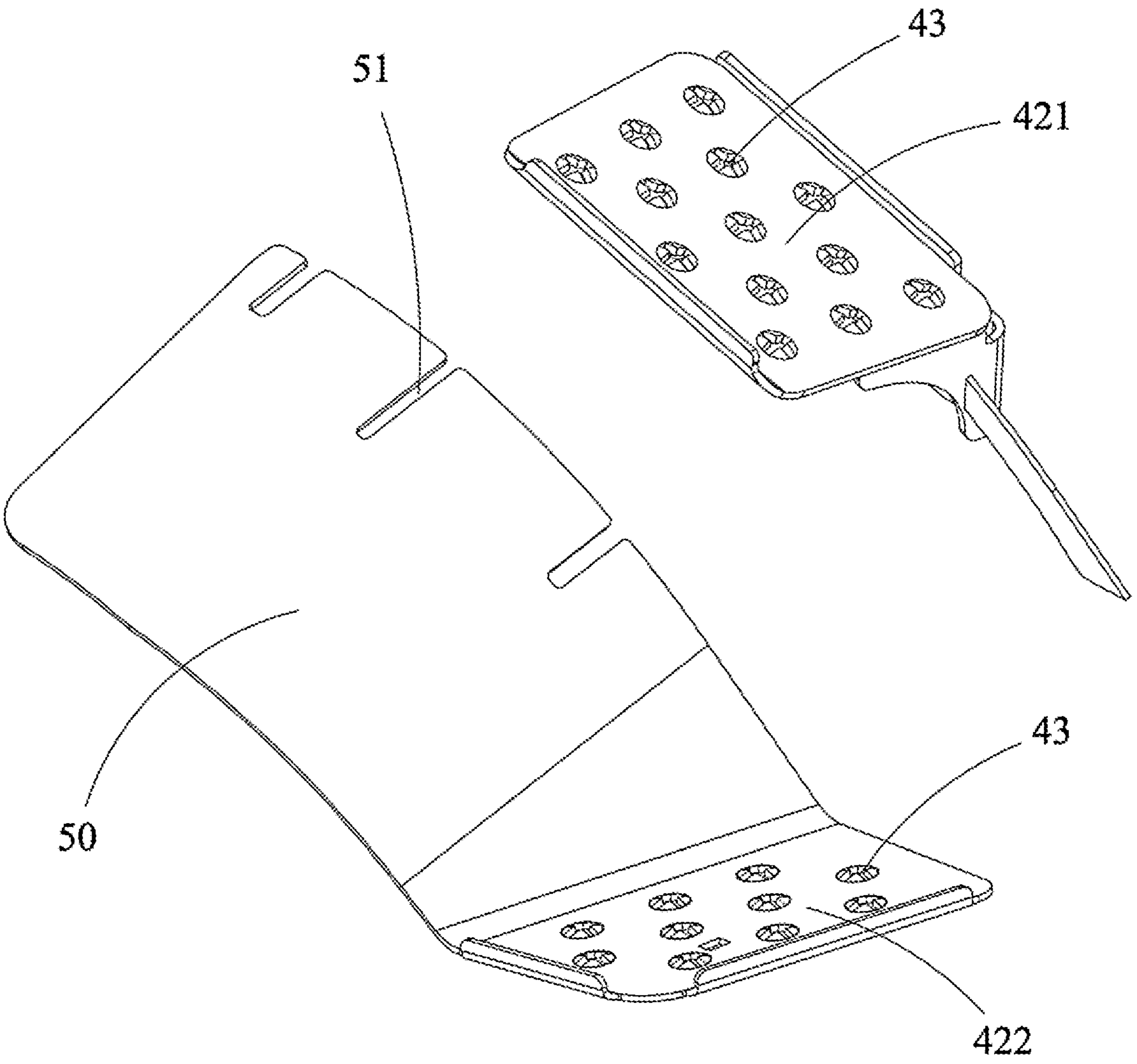
FIG. 8 is a perspective schematic view of a pedal and a fender.
Figure 9:
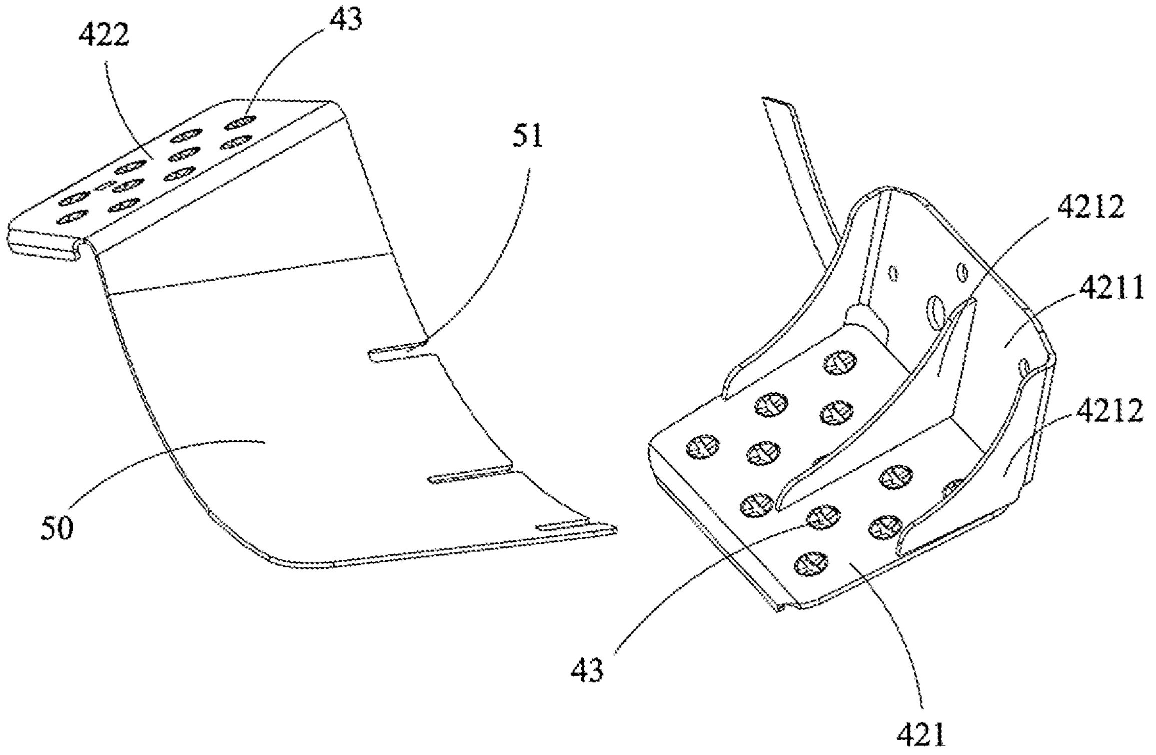
FIG. 9 is a perspective schematic view of the pedal and the fender from another angle.

Further, please refer to FIG. 7, FIG. 8 and FIG. 9, the mower 100 is further provided with a fender 50 matched with the rear wheels 62. The fender 50 is in a shape of an arc, and a clamping groove 51 is arranged on a side of the fender 50. One side of the first pedal 421 is bent and extended to define a mounting part 4211 and a stiffener 4212 located between the first pedals 421 and the mounting part 4211. The first pedals 421 are mounted on vehicle body 10 through the mounting part 4211. The fender 50 is clamped and fixed on the stiffener 4211 through the clamping groove 51. The second pedal 422 is located at a rear end of the fender 50. In a specific example of this embodiment, the second pedal 422 and the fender 50 are integrally formed. Preferably, anti-slip patterns 43 are further arranged on the platform 41, the first pedals 421, and the second pedals 422.

Further, please refer to FIG. 6, in the forward direction AA of the mower 100, a distance S1 between the first pedal 421 and a center of gravity G1 of the mower 100 is from 10 cm to 60 cm. In some embodiments, the distance S1 is from 15 cm to 55 cm. In some embodiments, the distance S1 is from 20 cm to 50 cm. In some other embodiments, the distance S1 is from 25 cm to 45 cm. In some embodiments, the distance S1 is from 30 cm to 40 cm. In a specific example of this embodiment, the distance S1 is set to be 35 cm. In the forward direction AA of the mower 100, the mower 100 has a centerline CC. A distance S2 between the first pedal 421 and the centerline CC is from 20 cm to 60 cm. In some embodiments, the distance S2 is from 25 cm to 55 cm. In some embodiments, the distance S2 is from 30 cm to 50 cm. In some embodiments, the distance S2 is from 35 cm to 45 cm. A distance S3 between the second pedal 422 and the centerline CC is from 30 cm to 70 cm. In some embodiments, the distance S3 is from 35 cm to 65 cm. In some embodiments, the distance S3 is from 40 cm to 60 cm. In some embodiments, the distance S3 is from 45 cm to 55 cm. With this arrangement, it may further enhance a stability of the mower 100 and avoid a disadvantage that the mower 100 is prone to being overturned when the first pedal 421 or the second pedal 422 is stressed. In a specific example of this embodiment, the distance S2 is set to be 43 cm, and the distance S3 is set to be 50 cm. It should be noted that in this embodiment, S1 is a distance between a foremost end of the first pedal 421 and the center of gravity G1 of the mower 100 in the forward direction AA of the mower 100. S2 is a distance between an outermost end of the first pedal 421 away from the mower 100 and the centerline CC. S3 is a distance between an outermost end of the second pedal 422 away from the mower 100 and the centerline CC.

Figure 10:
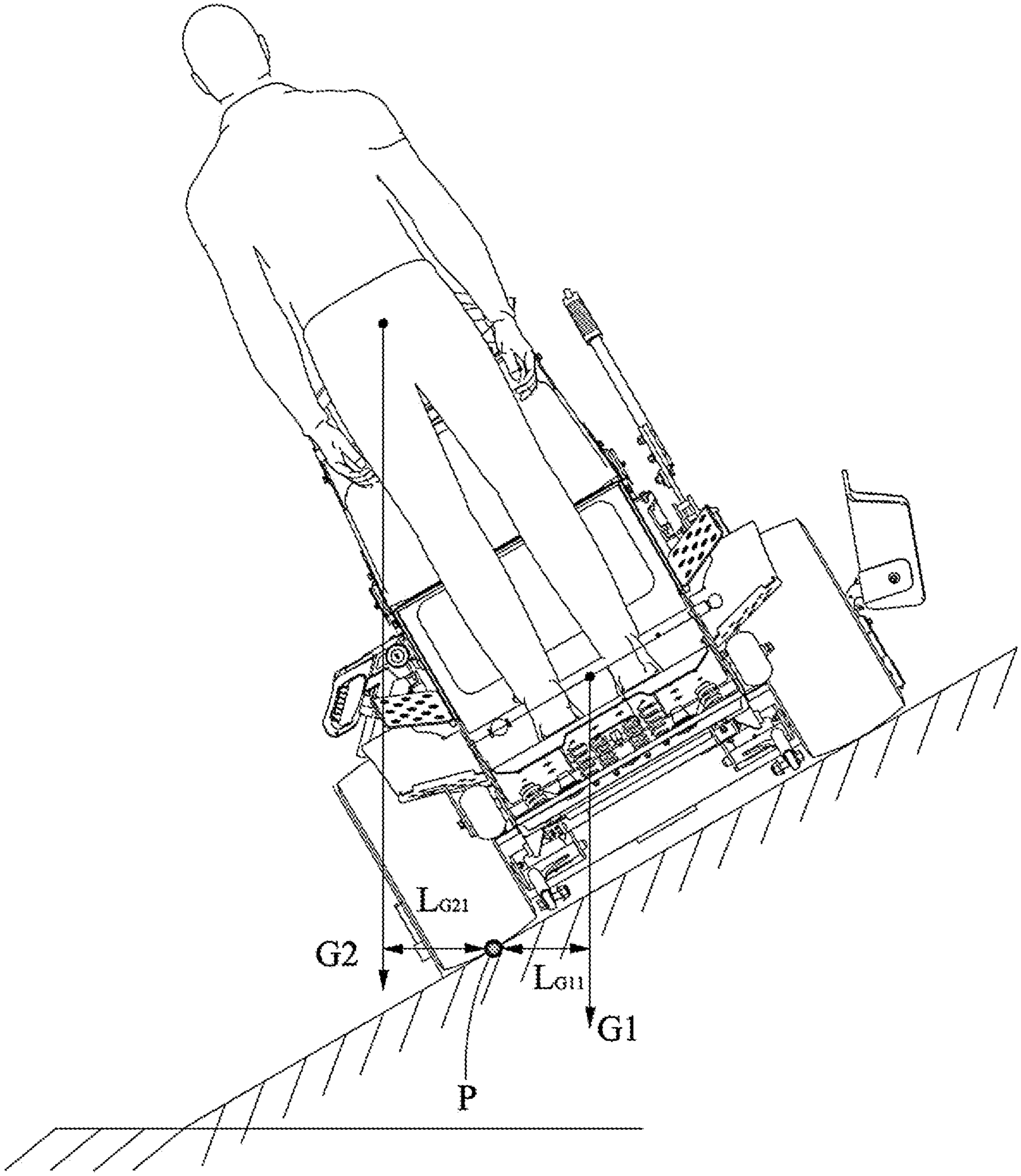
FIG. 10 is a schematic view of a user standing on a platform with both feet.
Figure 11:
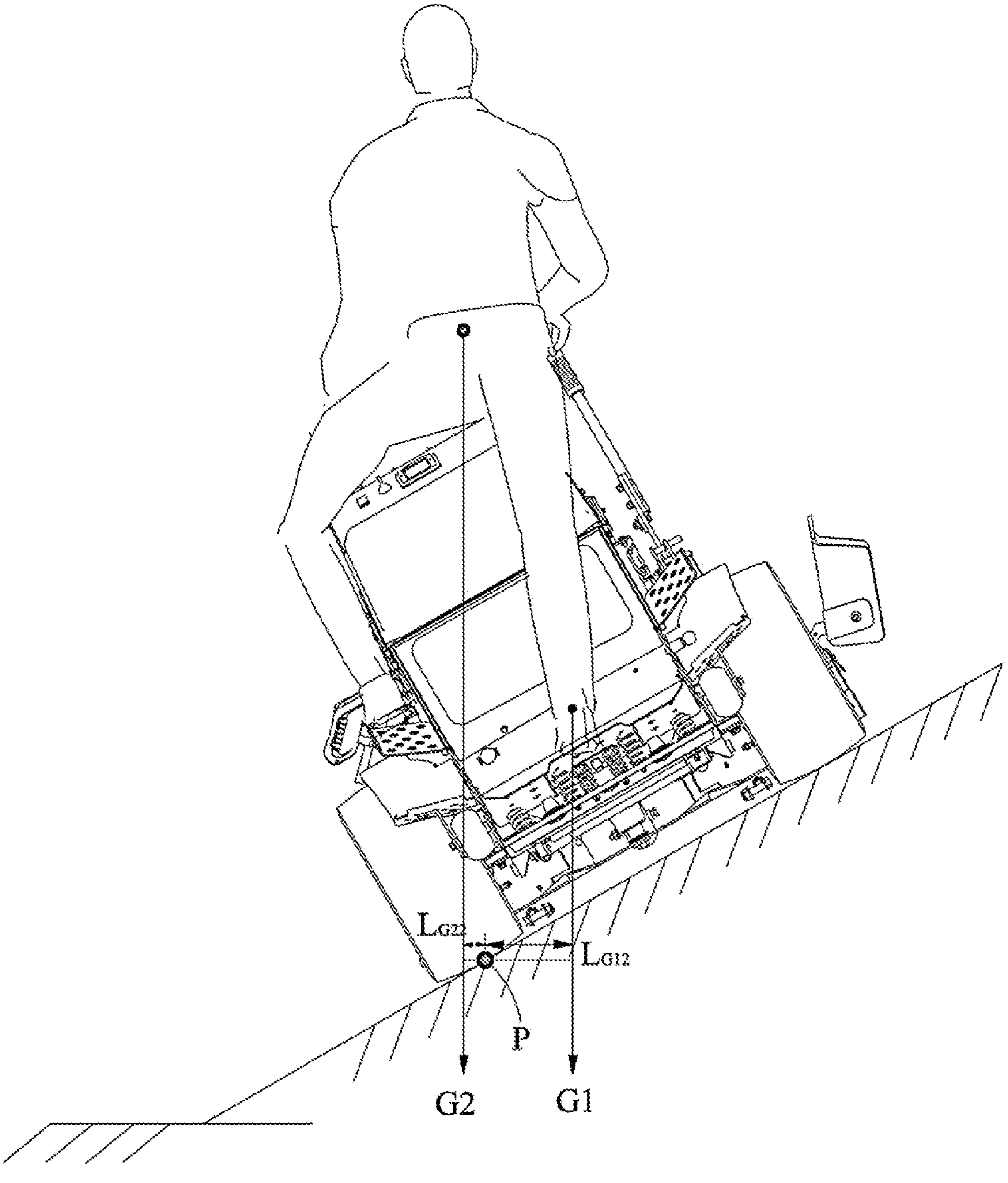
FIG. 11 is a schematic view of the user stepping on the platform with one foot and stepping on the pedal with the other foot.
Figure 12:
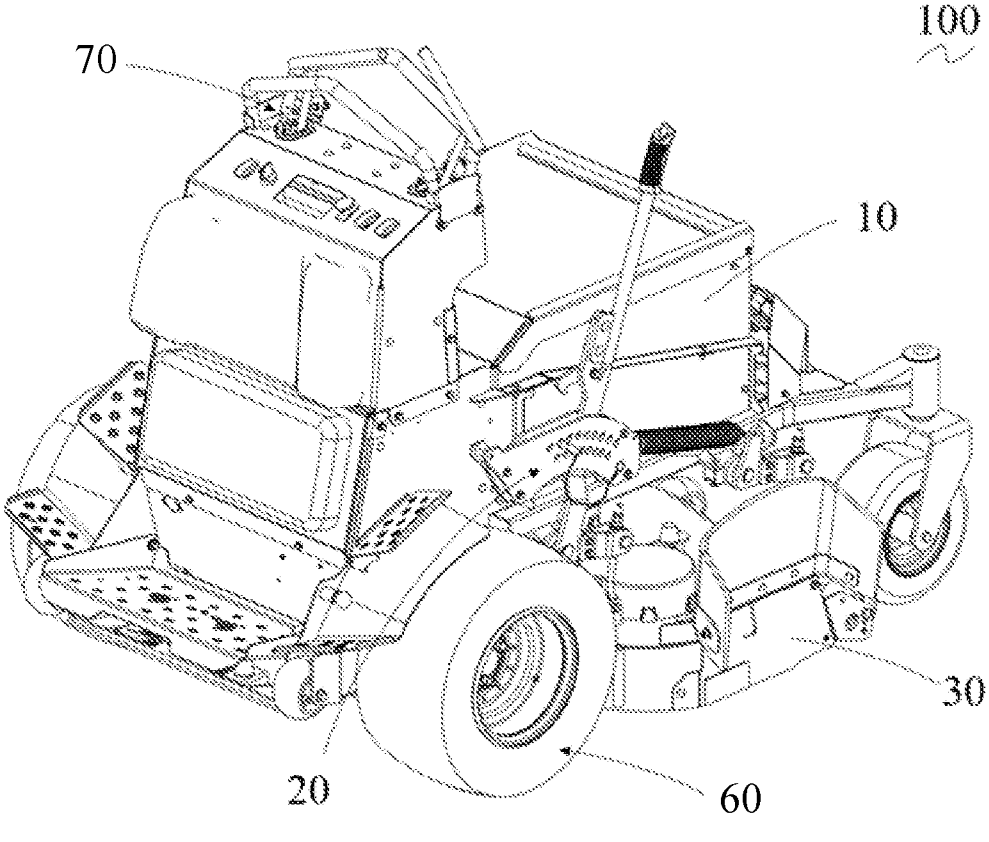
FIG. 12 is a structural schematic view of a mower in a second embodiment of the disclosure.

FIG. 10 shows a standing posture when the user is standing on a mower with only one platform. At this time, when the mower is overturned, the fulcrum is P. A moment $M_{G1}$ of the gravity G1 of the mower relative to the fulcrum P is $M_{G1}$=G1*$L_{G11}$, and a moment $M_{G2}$ of the user's gravity G2 relative to the fulcrum P is $M_{G2}$=G2*$L_{G21}$. Wherein, the moment $M_{G1}$ prevents the mower from being overturned, and the moment $M_{G2}$ pushes the mower over. When the moment $M_{G1}$ is greater than the moment $M_{G2}$, the mower will not be overturned. On the contrary, when the moment $M_{G1}$ is less than the moment $M_{G2}$, the mower is overturned. FIG. 11 shows a standing posture when the user stands on the mower 100 of this embodiment. At this time, the moment $M_{G1}$ of the gravity G1 of the mower relative to the fulcrum P is $M_{G1}$=G1*$L_{G12}$, and the moment $M_{G2}$ of the user's gravity G2 relative to the fulcrum P is $M_{G2}$=G2*$L_{G22}$. Since the user balances himself with help of the first pedal 421 or the second pedal 422, the user's own gravity G2 approaches the fulcrum P, so that the force arm $L_{G22}$ is smaller than the force arm $L_{G21}$, and the mower 100 of this embodiment is not easy to be overturned. Secondly, since the first pedal 421 and the second pedal 422 are arranged on an outside of the body 10, and one foot of the user steps on the first pedal 421 or the second pedal 422, when the mower 100 is overturned, the user can also quickly escape from the mower 100.

Compared with conventional art, since the mower 100 of this embodiment is provided with a platform 41 and pedal 42 with different heights, when the mower is on a slope, the user may stand firm and upright, and may easily adjust his own center of gravity, so that the mower 100 of this embodiment is not easy to be overturned.

Second Embodiment

This embodiment discloses a mower 100 with a height adjustment mechanism 20 for adjusting a mowing height and a mowing position of the mower 100. Of course, the height adjustment mechanism 20 may also be applied to other garden tools. It is not described in detail here, nor does it make any restrictions. For clarity of description, following part of the specification will take the height adjustment mechanism 20 applied to the mower 100 as an example to describe a specific structure of the height adjustment mechanism 20 in detail.

As shown in FIG. 12 through FIG. 18, this embodiment discloses the mower 100, which includes a body 10, the height adjustment mechanism 20, and a working unit 30 (also referred to as a cutting deck). Wherein, the working unit 30 is arranged below the body 10, and the height adjustment mechanism 20 is arranged above the working unit 30 and connected with the working unit 30 for adjusting a height of the working unit 30. The working unit 30 is provided with a cutting assembly 31, wherein the cutting assembly 31 includes a cutter and a motor for driving the cutter. In a specific example of this embodiment, the cutting assembly 31 is provided in three groups and arranged in a staggered front and rear position. The height adjustment mechanism 20 may adjust a height of the cutting assembly 31 so as to adjust the height of the cutting assembly 31 and the mowing position.

Figure 13:
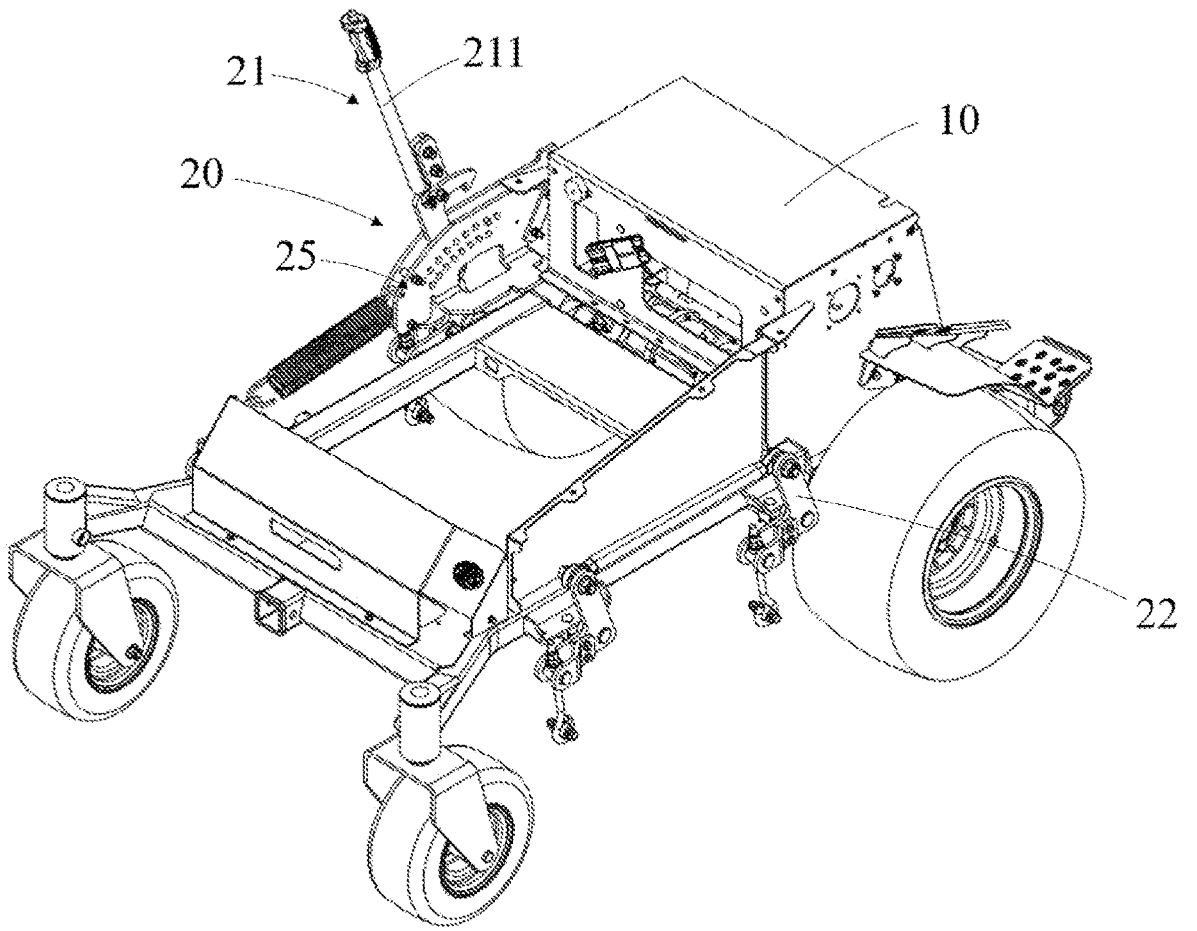
FIG. 13 is a partial structural schematic view of the mower in the second embodiment of the disclosure.
Figure 14:
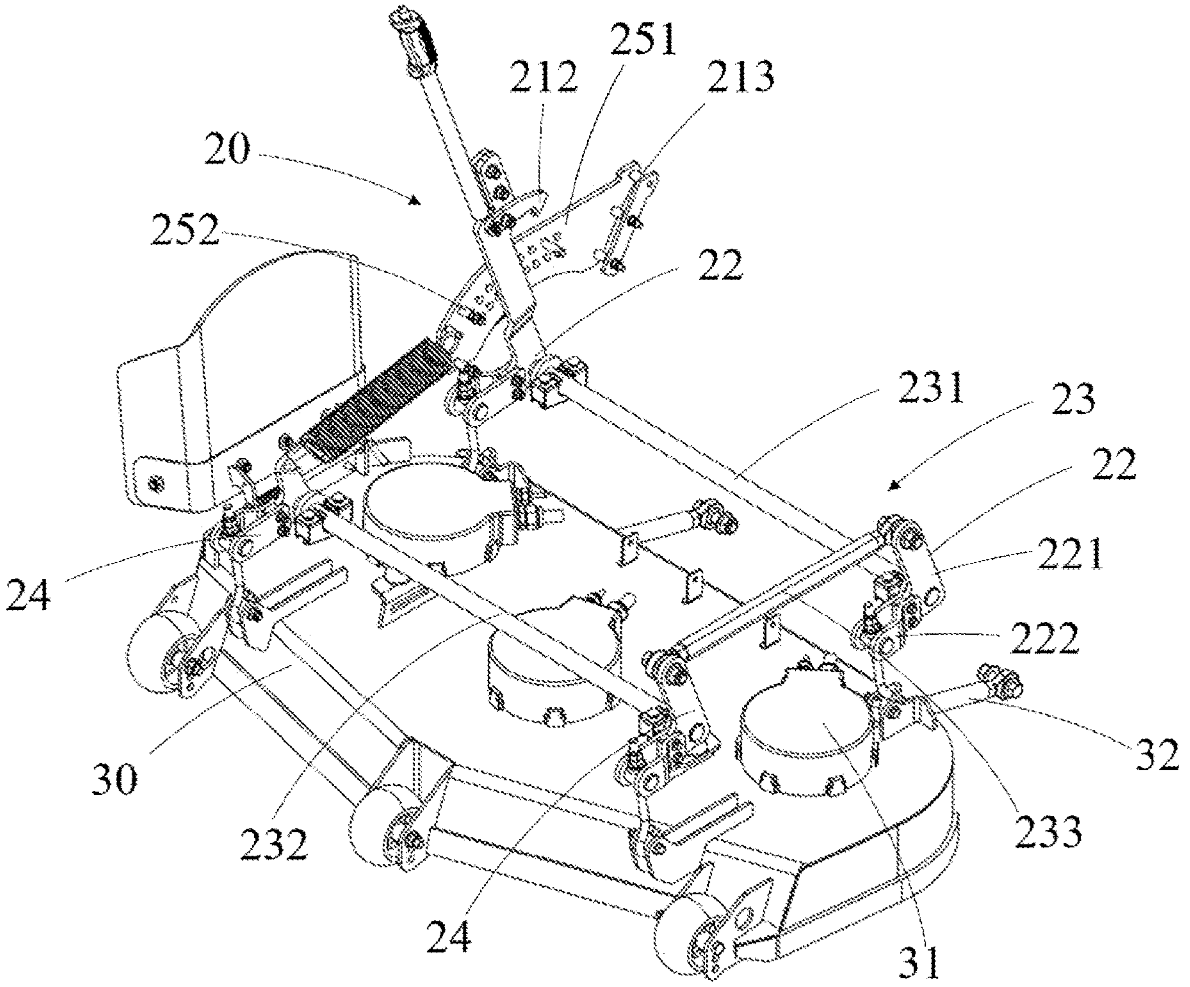
FIG. 14 is a structural schematic view of a height adjustment mechanism and a cutting deck of the mower in the second embodiment of the disclosure.

As shown in FIG. 13 and FIG. 14, further, the working unit 30 is further provided with a fixed rod 32 for fixing the working unit 30. The fixed rod 32 is used to restrict a movement or shaking of the working unit 30 in a front-rear direction or a left-right direction, so that the height adjustment mechanism 20 may adjust a horizontal height of the working unit 30.

Specifically, the height adjustment mechanism 20 includes a handle assembly 21, a first height adjustment plate 22, and a transmission assembly 23. The handle assembly 21 includes a handle 211. A lower end of the handle 211 is movably arranged on the body 10 and the handle 211 may rotate about the lower end of the handle 211. In this embodiment, there is a pair of first height adjustment plate 22, which means two first height adjustment plate 22. The first height adjustment plate 22 includes a vertical plate 221 and a horizontal plate 222 that are connected with each other, which means that the first height adjustment plate 22 is approximately L-shaped. The pair of first height adjustment plates 22 are respectively arranged symmetrically on both sides of the body 10, and the horizontal plates 222 are rotatably connected with the working unit 30, so that the working unit 30 remains horizontal after being lifted by the horizontal plates 222. The handle 211 is connected with one of the vertical plates 221 so that the handle 211 may drive the horizontal plates 222 to be lifted when the handle 211 rotates, which realizes a height adjustment of the working unit 30. The transmission assembly 23 includes a first transmission shaft 231. The first transmission shaft 231 is connected with the handle 211. The first transmission shaft 231 is perpendicular to a rotation plane of the handle 211 and rotates synchronously with the handle 211 so as to drive the pair of first height adjustment plates 22 to rotate synchronously, which realizes the height adjustment of the working unit 30.

The pair of first height adjustment plates 22 are arranged at both ends of the first transmission shaft 231, and the pair of first height adjustment plates 22 are respectively connected with the working unit 30 and the handle assembly 21. The height of the working unit 30 may be adjusted by rotating the handle assembly 21. Specifically, the pair of first height adjustment plates 22 may be connected with the working unit 30 through connecting rods, and a length of the connecting rods may be set as required. Of course, the connecting rods may also be in other forms, which is not limited here.

In this embodiment, the height adjustment mechanism 20 further includes second height adjustment plates 24, a second transmission shaft 232 and a linkage rod 233. The second height adjustment plates 24 have a same structure as the first height adjustment plates 22, and there is also a pair of the second height adjustment plates 24 in this embodiment. The pair of second height adjustment plates 24 are arranged at both ends of the second transmission shaft 232 and may rotate synchronously around an axis of the second transmission shaft 232. The linkage rod 233 and the handle assembly 21 are respectively arranged on both sides of the body 10, and the linkage rod 233 is used to connect the vertical plates 221 of the first height adjustment plate 22 and of the second height adjustment plate on the same side, so that the handle 211 can drive the pair of first height adjustment plates 22 and the pair of second height adjustment plates 24 to rotate, that is, the height adjustment mechanism 20 are connected with the working unit 30 by four sets of height adjustment plates, which may enhance the structural strength and stability.

Figure 15:
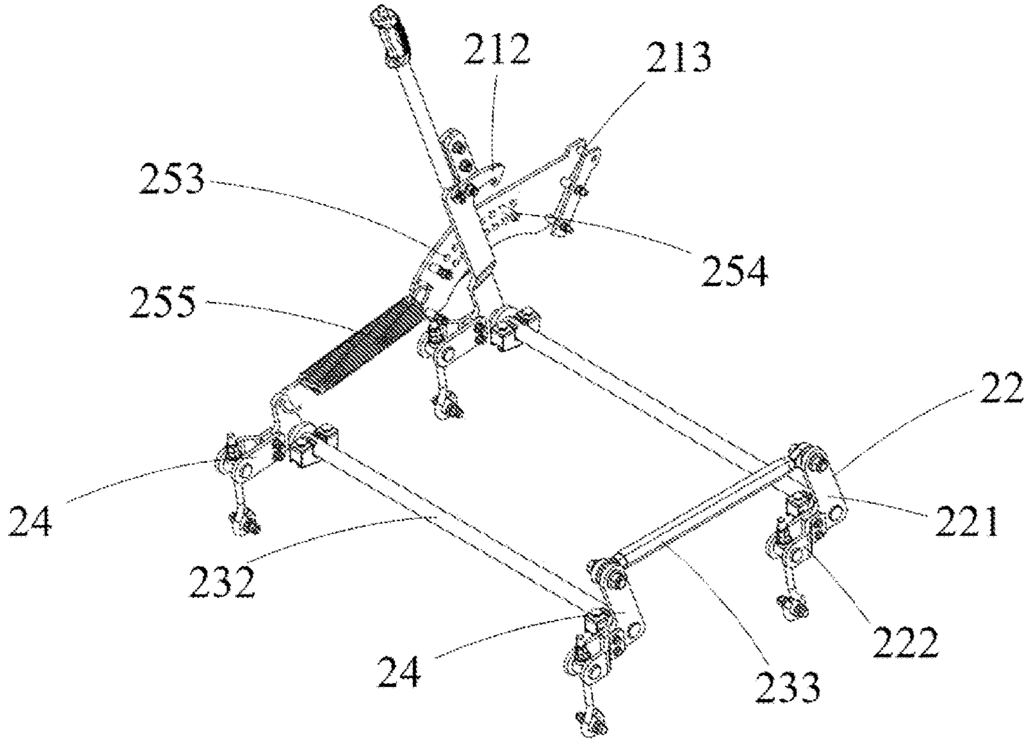
FIG. 15 is a schematic structural view of the height adjustment mechanism of the mower in the second embodiment of the disclosure.
Figure 16:
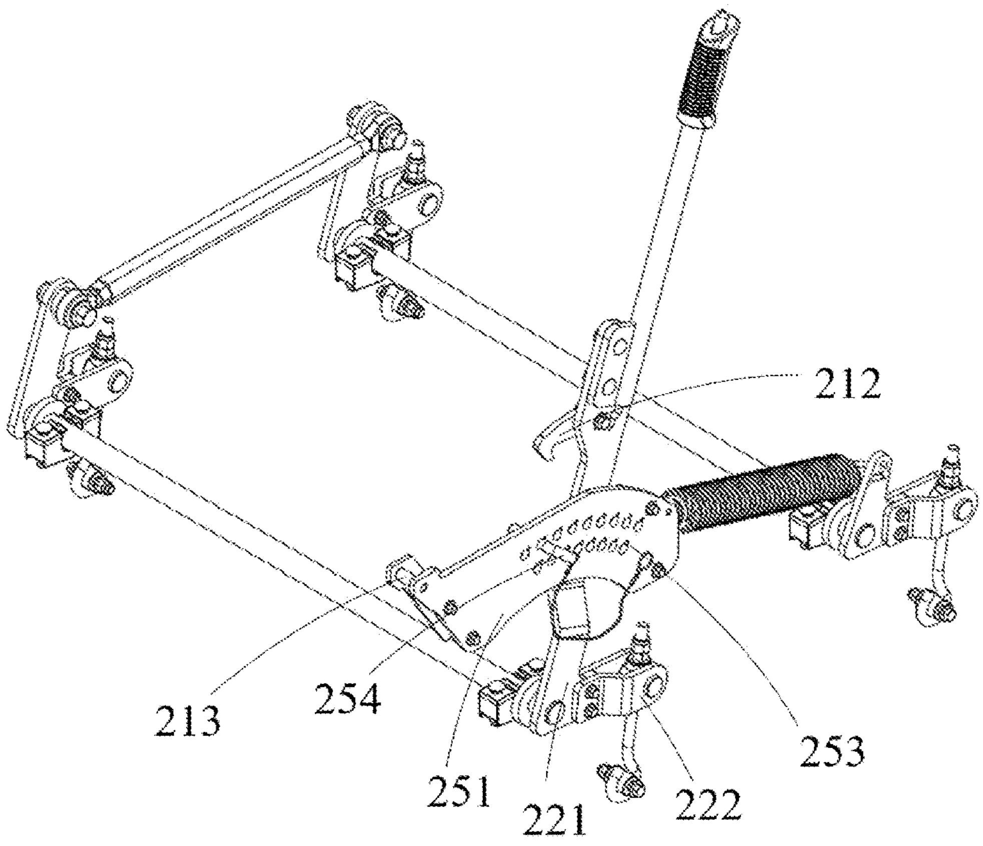
FIG. 16 is a schematic view of FIG. 15 from another angle.
Figure 17:
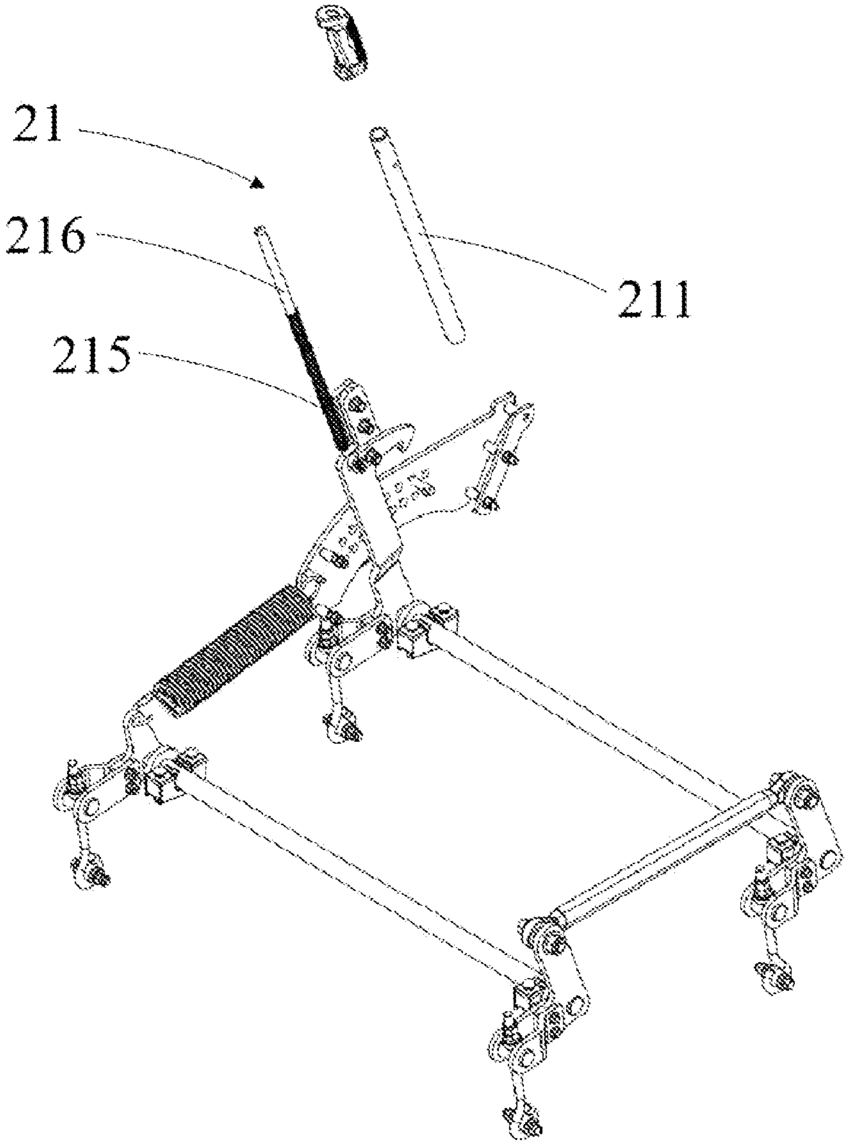
FIG. 17 is a partial structural exploded view of the height adjustment mechanism in FIG. 15.

As shown in FIG. 15 through FIG. 17, in this embodiment, the height adjustment mechanism 20 further includes a limiting assembly 25 arranged vertically for limiting the handle 211. The limiting assembly 25 includes two parallel side plates 251 arranged in front and rear directions, the two side plates 251 are arranged on a side of the body 10, and the two side plates 251 are used to limit a rotation direction of the handle 211 on left and right sides, so that the handle 211 rotates between the two side plates 251 along the front and rear direction. The two side plates 251 are connected through a plurality of limiting bolts 252 and are provided with a gap for the handle 211 to rotate. The limiting bolts 252 are used to limit the handle 211 in front and rear directions.

Further, the two side plates 251 are correspondingly provided with a plurality of horizontally penetrating limiting holes 253, the side plate 251 further includes a limiting rod 254 for clamping with the limiting hole 253, the limiting rod 254 may be arranged in different limiting holes 253 to limit and fix the handle 211 at different angles. Specifically, one end of the limiting rod 254 is provided with a rope or a chain connected to the limiting assembly 25, so that the limiting rod 254 may be taken out from the limiting hole 253 through pulling the rope or the chain, and at the same time the limiting rod 254 may be prevented from being lost.

The limiting assembly 25 is further provided with an elastic fixing component 255. One end of the elastic fixing component 255 is fixed on the limiting assembly 25, and the other end is used to connect with a vertical plate 221 of the second height adjustment plate 24 on the same side of the handle assembly 21, so as to fix the pair of second height adjustment plates 24 after an adjustment of the height adjustment mechanism 20. Specifically, the elastic fixing component 255 may be a spring. Of course, the elastic fixing component 255 may also be in a form of a connecting rod or the like, which is not limited here. When the working unit 30 is in a lowest position, the elastic fixing component 255 is in a stretched state. During a gradual raising of the working unit 30, the working unit 30 receives an upward restoring force of the elastic fixing component 255, which may reduce a force exerted by the operator, thereby saving more effort.

Figure 18:
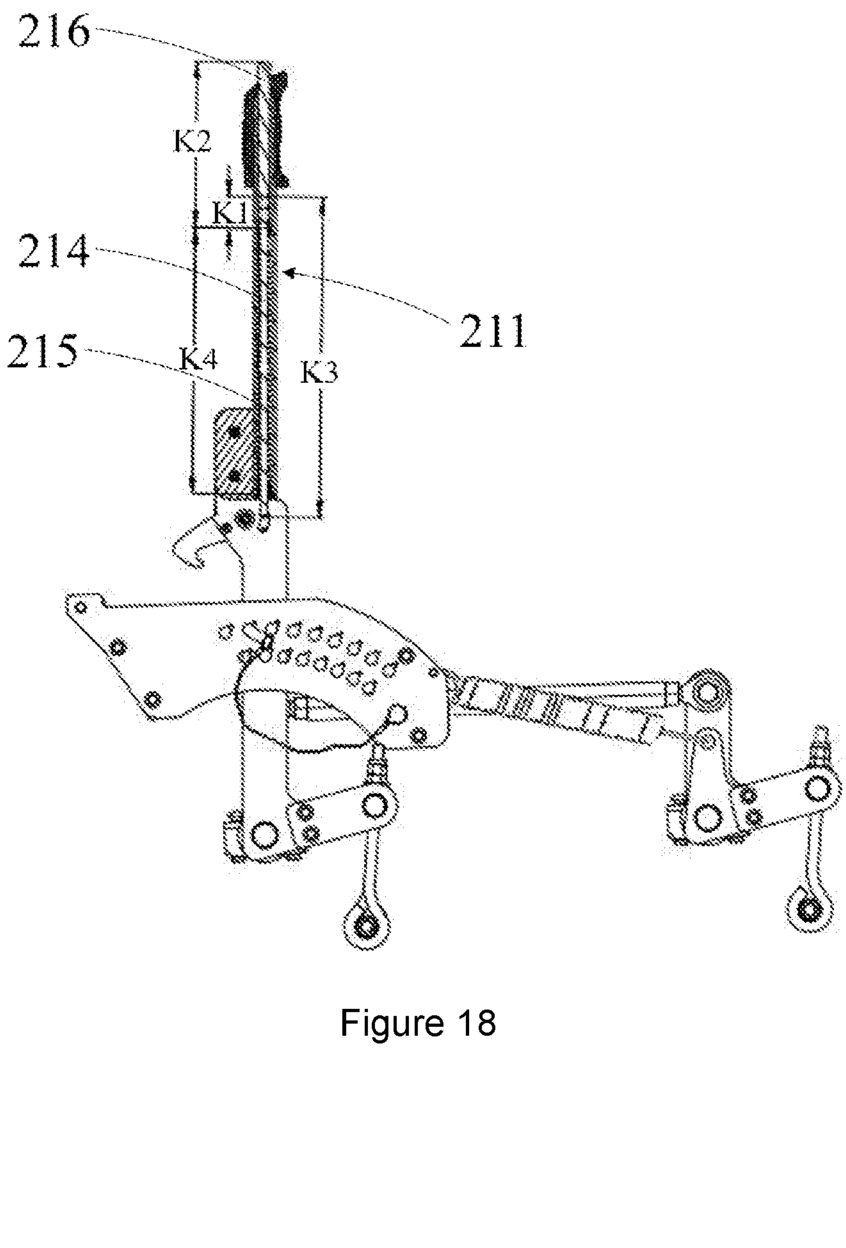
FIG. 18 is a cross-sectional structural view of a handle assembly of the mower in the second embodiment of the disclosure.

As shown in FIG. 17 and FIG. 18, preferably, the handle 211 is provided with a hook 212 for fixing the handle 211. A fixed shaft 213 for the hook 212 to be hooked is correspondingly arranged between the two side plates 251. The fixed shaft 213 is horizontally arranged and parallel to the limiting bolt 252.

The handle 211 is embedded with a control rod 214 for controlling the hook 212 to bounce up, the hook 212 is movably connected with the control rod 214, the hook 212 is fixed on the handle 211 by a bolt and may rotate around the bolts, the hook 212 is provided with a hook connecting part for clamping, and the control rod 214 and the hook connecting part are respectively located at both ends of the hook 212, which means that the control rod 214 is located at one end of the hook 212, and the hook connecting part is located at the other end of the hook 212, and the bolt is arranged in a middle position of the control rod 214 and the hook connecting part, so that the hook 212 may rotate around the bolt after pressing the control rod 214. An elastic reset component 215 is sheathed outside the control rod 214 for resetting the control rod 214 after the control rod 214 is pressed. Specifically, the elastic reset component 215 may be a spring.

Further, the control rod 214 is provided with a pressing shaft 216 threadedly connected for pressing, the pressing shaft 216 is protrudingly arranged in the handle 211, and a lower end of the pressing shaft 216 abuts against the elastic reset component 215. Wherein, a depth of a threaded connection between the control rod 214 and the pressing shaft 216 may be adjusted. Preferably, the depth K1 of the threaded connection is set to be 35 mm. By increasing or reducing the depth of the threaded connection, an elastic force of the elastic reset component 215 may be strengthened or reduced, so as to adjust a bounce position of the hook 212. Specifically, a length K2 of the pressing shaft 216 may be set to be 185 mm, a length K3 of the control rod 214 may be set to be 357 mm, and a length K4 of the elastic reset component 215 may be set to be 297 mm.

An operation process of the height adjustment mechanism 20 of this embodiment will be described in detail below.

After pressing the pressing shaft 216, the pressing shaft 216 drives the control rod 214 to press down, so that one end of the hook 212 is pressed down and the hook connecting part at the other end of the hook 212 is lifted. Through controlling the handle 211 to rotate and enable the hook 212 to approach the fixed shaft 213 and then releasing the pressing shaft 216, the elastic reset component 215 drives the pressing shaft 216 and the control rod 214 to reset, which enables the hook connecting part of the hook 212 press down to be clamped on the fixed shaft 213. At this time, both the horizontal plates 222 of the first height adjustment plate 22 and the second height adjustment plate 24 are lifted to increase the height of the working unit 30 so that the working unit 30 is at a highest position.

Similarly, after pressing the pressing shaft 216, a connection between the hook 212 and the fixed shaft 213 is released, the handle 211 is controlled to rotate and the horizontal plate 222 is pressed downward to reduce the height of the working unit 30. When the working unit 30 is adjusted to a set height, the limiting rod 254 is inserted through the limiting hole 253 for clamping and the handle 211 abuts against the limiting rod 254, so as to fix the handle 211 to adjust an angle, thereby fixing a descending height of the working unit 30.

In this embodiment, the mower 100 is further provided with a control unit 70 (also called an armrest assembly) for the user to hold and a wheel unit 60. The control unit 70 is provided with a self-driving control switch for driving the wheel unit 60 and a cutting assembly control switch for controlling the cutting assembly 31, which is convenient for operation. The mower 100 is further provided with a battery pack (not shown) for powering the mower 100.

In summary, this embodiment provides a height adjustment mechanism 20 with a self-locking structure, which can adjust a height of mowing, may be operated with one hand, and the structure is safe and reliable.

The above embodiments are only used to illustrate technical solutions of the disclosure and not to limit them. Although the disclosure has been described in detail with reference to the preferred embodiments, those of ordinary skill in the art should understand that the technical solutions of the disclosure may be modified or equivalently replaced, without departing from spirit and scope of the technical solutions of the disclosure.

What is claimed is:

1. A mower, comprising:

a body;

a working unit, coupled to the body;

a wheel unit, mounted on the body and comprising a front wheel unit and a rear wheel unit;

a platform, mounted to the body and located on a side of the rear wheel unit away from the front wheel unit; and a pedal, being located on a side of the body in an axial direction of the rear wheel unit;

wherein a height of the pedal to ground is greater than a height of the platform to the ground, wherein the pedal comprises a first pedal and a second pedal, wherein in a forward direction of the mower, the second pedal is located on a side of the first pedal away from the front wheel unit, and wherein the wheel unit further comprises a fender matched with the rear wheel unit and the first pedal and the second pedal are mounted on the fender.

2. The mower according to claim 1, wherein a height of the first pedal to the ground is greater than a height of the second pedal to the ground.

3. The mower according to claim 1, wherein in the forward direction of the mower, a length of the first pedal is greater than a length of the second pedal.

4. The mower according to claim 1, wherein in the axial direction of the rear wheel unit, a width of the first pedal is smaller than a width of the second pedal.

5. The mower according to claim 1, wherein a projection of the first pedal on a horizontal plane at least partially overlaps a projection of the rear wheel unit on the horizontal plane.

6. The mower according to claim 1, wherein
a projection of the second pedal on a horizontal plane does not overlap a projection of the rear wheel unit on the horizontal plane.

7. The mower according to claim 1, wherein
an angle between the first pedal and a forward direction of the mower is from 0° to 60°,
and an angle between the first pedal and the axial direction of the rear wheel unit is from 0° to 50°.

8. The mower according to claim 1, wherein
an angle between the second pedal and a forward direction of the mower is from 0° to 40°.

9. The mower according to claim 1, wherein
an angle between the second pedal and the axial direction of the rear wheel unit is from 0° to 50°.

10. The mower according to claim 1, wherein
a vertical height of the first pedal from a horizontal ground is from 30 cm to 60 cm.

11. The mower according to claim 1, wherein
the first pedal is in a forward direction of the mower, a distance between the first pedal and a center of gravity of the mower is from 10 cm to 60 cm.

12. The mower according to claim 1, wherein
an area of the first pedal is from 150 $cm^2$ to 850 $cm^2$.

13. The mower according to claim 1, wherein
the first pedal is in a forward direction of the mower, the mower has a centerline, and a distance between the first pedal and the centerline is from 20 cm to 60 cm.

14. The mower according to claim 1, wherein
a vertical height of the second pedal from a horizontal ground is from 20 cm to 50 cm.

15. The mower according to claim 1, wherein
an area of the second pedal is from 100 $cm^2$ to 800 $cm^2$.

16. The mower according to claim 1, wherein
the second pedal is in a forward direction of the mower, the mower has a centerline, and a distance between the second pedal and the centerline is from 30 cm to 70 cm.

17. A mower, comprising:
a body;
a working unit, coupled to the body;
a wheel unit, mounted on the body and comprising a front wheel unit and a rear wheel unit;
a platform, mounted on the body and located on a side of the rear wheel unit away from the front wheel unit; and
a pedal, being located on a side of the body in an axial direction of the rear wheel unit,
wherein the pedal comprises a first pedal and a second pedal,
wherein in a forward direction of the mower, the second pedal is located on a side of the first pedal away from the front wheel unit, and
wherein the wheel unit further comprises a fender matched with the rear wheel unit and the first pedal and the second pedal are mounted on the fender.

18. A mower, comprising:
a body;
a working unit, coupled to the body;
a wheel unit, mounted on the body and comprising a front wheel unit and rear wheel unit;
a platform, mounted on the body and located on a side of the rear wheel unit away from the front wheel unit; and
a pedal, being located on a side of the body in an axial direction of the rear wheel unit, the pedal comprising a first pedal and a second pedal, a height of the first pedal to ground being greater than a height of the second pedal to the ground,
wherein in a forward direction of the mower, the second pedal is located on a side of the first pedal away from the front wheel unit, and
wherein the wheel unit further comprises a fender matched with the rear wheel unit and the first pedal and the second pedal are mounted on the fender.

* * * * *